(12) United States Patent
Quatannens et al.

(10) Patent No.: US 10,862,155 B2
(45) Date of Patent: Dec. 8, 2020

(54) MODULAR ENCLOSURES FOR FUEL CELL STACKS THAT ALLOW FOR INDIVIDUAL INSTALLATION AND REPLACEMENT OF A FUEL CELL STACK IN THE FIELD

(71) Applicant: FuelCell Energy, Inc., Danbury, CT (US)

(72) Inventors: Michael L. Quatannens, Mount Kisco, NY (US); Matthew Lambrech, Sherman, CT (US); Fred C. Jahnke, Rye, NY (US)

(73) Assignee: FuelCell Energy, Inc., Danbury, CT (US)

( * ) Notice: Subject to any disclaimer, the term of this patent is extended or adjusted under 35 U.S.C. 154(b) by 46 days.

(21) Appl. No.: 16/097,135

(22) PCT Filed: Apr. 28, 2017

(86) PCT No.: PCT/US2017/030264
§ 371 (c)(1),
(2) Date: Oct. 26, 2018

(87) PCT Pub. No.: WO2017/190088
PCT Pub. Date: Nov. 2, 2017

(65) Prior Publication Data
US 2019/0115610 A1     Apr. 18, 2019

Related U.S. Application Data

(60) Provisional application No. 62/329,509, filed on Apr. 29, 2016.

(51) Int. Cl.
*H01M 8/02*     (2016.01)
*H01M 8/2485*    (2016.01)
(Continued)

(52) U.S. Cl.
CPC ......... *H01M 8/2485* (2013.01); *H01M 8/247* (2013.01); *H01M 8/249* (2013.01);
(Continued)

(58) Field of Classification Search
CPC .. H01M 8/2485; H01M 8/247; H01M 8/2465; H01M 8/2475; H01M 8/249; H01M 2008/147; Y02E 60/526
See application file for complete search history.

(56) References Cited

U.S. PATENT DOCUMENTS 5,688,610 A    11/1997   Spaeh et al.
5,750,280 A *   5/1998   Akagi ................. H01M 8/2425
                                                       429/456
(Continued)

OTHER PUBLICATIONS

International Search Report and Written Opinion in PCT/US2017/030264 dated Jul. 6, 2017 (9 pages).

*Primary Examiner* — Cynthia K Walls
(74) *Attorney, Agent, or Firm* — Foley & Lardner LLP

(57) ABSTRACT

A fuel cell system includes at least one modular enclosure having a top wall, a bottom wall, and a plurality of side walls that connect the top wall and the bottom wall and close off the modular enclosure on all sides; at least one fuel cell stack disposed within the at least one modular enclosure; at least one piping manifold configured to supply at least one process gas to the at least one fuel cell stack and to receive at least one exhaust process gas from the at least one fuel cell stack; and at least one process gas seal configured to seal the at least one piping manifold. The at least one process gas seal is effected via a static force from a weight of the at least one fuel cell stack or a weight of the at least one piping manifold.

17 Claims, 9 Drawing Sheets

(51) Int. Cl.
*H01M 8/249* (2016.01)
*H01M 8/247* (2016.01)
*H01M 8/2465* (2016.01)
*H01M 8/2475* (2016.01)
*H01M 8/14* (2006.01)

(52) U.S. Cl.
CPC ....... *H01M 8/2465* (2013.01); *H01M 8/2475* (2013.01); *H01M 2008/147* (2013.01); *Y02E 60/526* (2013.01)

(56) References Cited

U.S. PATENT DOCUMENTS

| | | | |
|---|---|---|---|
| 2006/0060244 A1* | 3/2006 | Eggum | H01M 8/02 137/263 |
| 2008/0159842 A1 | 7/2008 | Kang et al. | |
| 2011/0045372 A1 | 2/2011 | Zafred et al. | |
| 2013/0130145 A1 | 5/2013 | Kaeding et al. | |

* cited by examiner

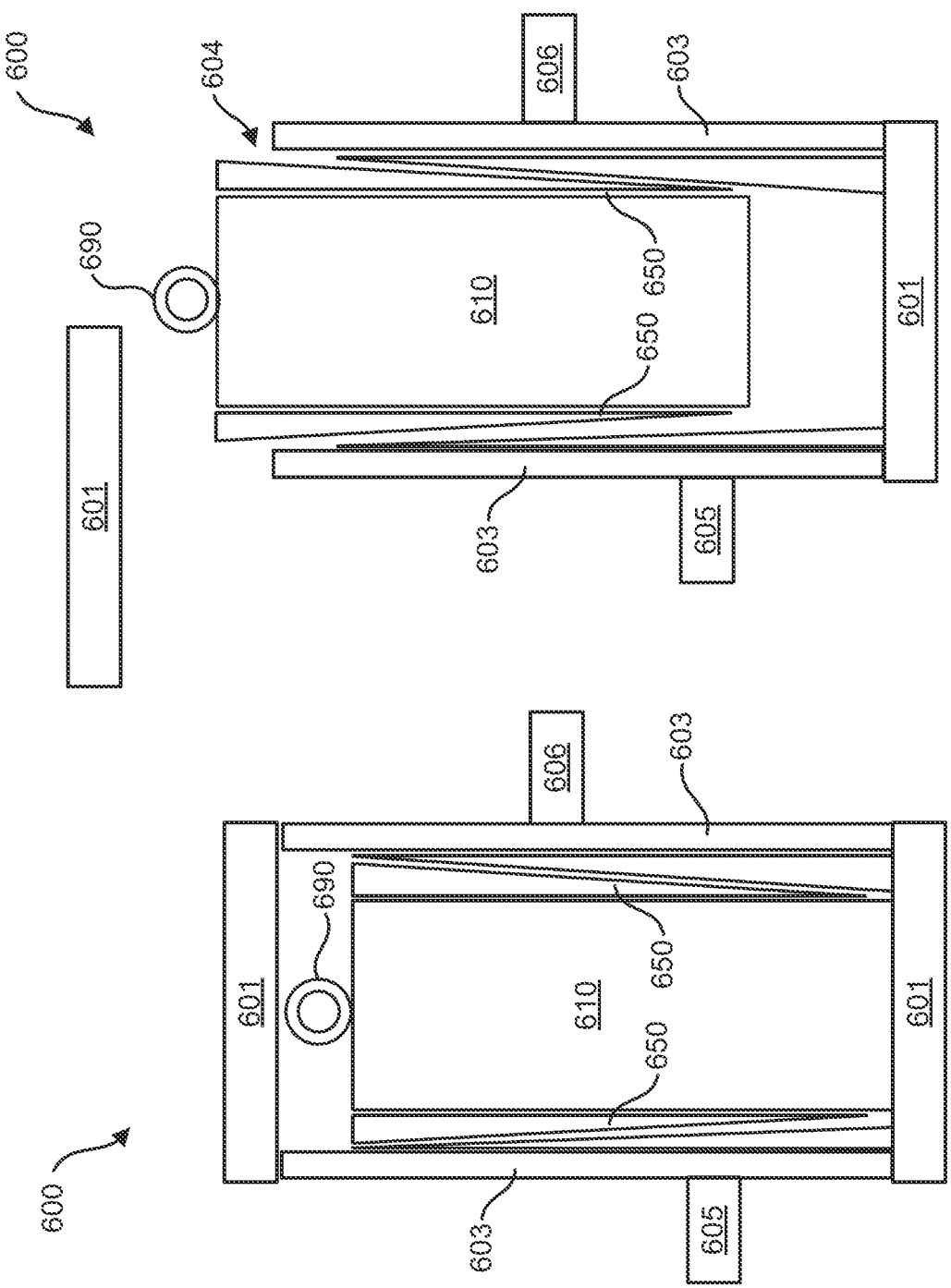

MODULAR ENCLOSURES FOR FUEL CELL STACKS THAT ALLOW FOR INDIVIDUAL INSTALLATION AND REPLACEMENT OF A FUEL CELL STACK IN THE FIELD

CROSS-REFERENCE TO RELATED APPLICATIONS

This application is a U.S. national stage entry of PCT/US2017/030264, filed on Apr. 28, 2017, which claims the benefit of and priority to U.S. Provisional Patent Application No. 62/329,509 filed on Apr. 29, 2016, the entire disclosures of which are incorporated by reference herein.

BACKGROUND

The present disclosure relates to fuel cell systems. In particular, the present disclosure relates to a fuel cell stack system that allows for easy exchange of the fuel cell stacks in the field.

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air.

Fuel cells are typically arranged in a stacked relationship. A fuel cell stack includes many individual cells positioned between a fixed end plate and a free end plate. One fuel cell stack configuration includes an externally manifolded stack, wherein the fuel cell stack is left open on its sides and a fluid such as a fuel or oxidant is delivered by way of manifolds sealed to peripheral portions of respective sides of the fuel cell stack. The manifolds thus provide sealed passages for delivering the fuel and the oxidant gases to the fuel cells and directing the flow of such gases in the stack, thereby preventing those gases from leaking either to the environment or to the other manifolds. Such manifolds are typically used in Molten Carbonate Fuel Cells (MCFC) which operate at approximately 650° C. During operation of MCFCs, the fuel cells and end plates can move relative to the fuel cell manifolds.

Conventional fuel cells typically include an anode and a cathode separated by an electrolyte contained in an electrolyte matrix. The anode, the cathode, the electrolyte and the electrolyte matrix are disposed between a first collector and a second collector, with the first collector adjacent to the anode and the second collector adjacent to the cathode. Fuel flows to the anode via the first collector and an oxidant flows to the cathode via the second collector. The fuel cell oxidizes the fuel in an electrochemical reaction which releases a flow of electrons between the anode and cathode, thereby converting chemical energy into electrical energy.

The fuel cells described above can be stacked in series with separator plates disposed between adjacent fuel cells and end plates (e.g., a fixed end plate and a free end plate) disposed on opposing ends of the fuel cell stack. Alternatively, the fuel cells described above can be stacked in parallel, and connected, for example, by a power bus. Fuel cells are stacked to increase the electrical energy they produce. Fuel cell stacks have a negative side with a negative end cell and a positive side with a positive end cell.

In order to increase power output without having to unduly increase the size (i.e., surface area) of individual fuel cells or the number of individual fuel cells in a fuel cell stack, a plurality of fuel cell stacks are electrically and fluidly connected. For large fuel cell systems including a large number of fuel cell stacks, it is difficult or impossible to transport the fuel cell system in an assembled state due to size and cost considerations. A power plant may include several of these large fuel cell systems. During repair or replacement of an individual fuel cell stack in the large fuel cell system, all of the fuel cell stacks need to be taken offline (i.e., shut down) because when the "hot zone" containing the fuel cell stacks is opened, the zone would be cooled down. As a result, the remaining fuel cell stacks would likely not be able to operate at the lower temperatures.

A need exists for improved technology, including technology related to a fuel cell system including a plurality of fuel cell stacks that can be individually (or in small groupings, e.g. 2 or 4) erected, installed, repaired or replaced in the field. A need also exists for improved technology relating to a fuel cell system sized such that only a partial shutdown is required during repair or replacement of an individual fuel cell stack.

SUMMARY

In certain embodiments, a fuel cell system includes at least one modular enclosure comprising a top wall, a bottom wall, and a plurality of side walls that connect the top wall and the bottom wall and close off the modular enclosure on all sides; at least one fuel cell stack disposed within the at least one modular enclosure; at least one piping manifold configured to supply at least one process gas to the at least one fuel cell stack and to receive at least one exhaust process gas from the at least one fuel cell stack; and at least one process gas seal configured to seal the at least one piping manifold. The at least one process gas seal is effected via a static force from a weight of the at least one fuel cell stack or a weight of the at least one piping manifold.

In certain embodiments, a method of installing a fuel cell system includes disposing at least one fuel cell stack in at least one modular enclosure comprising a top wall, a bottom wall, and a plurality of side walls that connect the top wall and the bottom wall and close off the modular enclosure on all sides; providing at least one piping manifold configured to supply at least one process gas to the at least one fuel cell stack and to receive at least one exhaust process gas from the at least one fuel cell stack; and sealing the at least one piping manifold with at least one process gas seal effected by a static force from a weight of the at least one fuel cell stack or a weight of the at least one piping manifold.

In one aspect, the at least one process gas seal is effected without mechanical means for connecting the at least one fuel cell stack, the at least one process gas seal, and the at least one piping manifold.

In one aspect, the at least one process gas seal comprises at least one of a compressive seal, a radial seal, or a tapered seal.

In one aspect, the at least one piping manifold is disposed within the at least one modular enclosure at a position below the at least one fuel cell stack; the at least one fuel cell stack is disposed on at least a portion of an upper surface of the at least one piping manifold; the at least one process gas seal is disposed between the at least one piping manifold and the at least one fuel cell stack; and the at least one process gas seal is effected via the static force from the weight of the at least one fuel cell stack against the angled walls of the at least one piping manifold.

In one aspect, the at least one piping manifold is disposed on the bottom wall of the modular enclosure.

In one aspect, the upper surface of the at least one piping manifold includes at least two projections with a gap therebetween; the at least one fuel cell stack is disposed on the at least two projections (i.e., hard stops); and the at least one process gas seal is disposed within the gap.

In one aspect, the fuel cell system further includes at least two fuel cell stacks. The at least one piping manifold is disposed within the at least one modular enclosure at a position between the at least two fuel cell stacks.

In one aspect, the at least one piping manifold comprises at least partially angled side walls; the at least two fuel cell stacks each comprise an angular extension configured to mate with an angled side wall of the piping manifold; the at least one process gas seal is disposed between the angled side wall of the at least one piping manifold and the angular extension of the at least two fuel cell stacks; and the at least one process gas seal is effected via the static force from the weight of the at least two fuel cell stacks.

In one aspect, a slope of the angled wall of the at least one piping manifold is the same as a slope of a surface of the angled extension facing the angled wall of the at least one piping manifold.

In one aspect, the at least one piping manifold is disposed within the modular enclosure. In another aspect, the at least one piping manifold is external to the modular enclosure.

In one aspect the bottom wall of the modular enclosure comprises a downwardly angled surface such that a height of a plane formed by the downwardly angled surface is greater at a location distal to the piping manifold than a height of a plane at a location proximal to the piping manifold; the at least two fuel cell stacks each comprise an angled extension that extends from a lower surface thereof, the angled extension comprising an upwardly angled surface configured to face the downwardly angled surface of the bottom wall of the modular enclosure; and a slope of the downwardly angled surface is the same as a slope of the upwardly angled surface.

In one aspect, the fuel cell system further includes at least one wheel connected to the upwardly angled surface of the angled extension. In operation, the at least one wheel is configured to roll upon the downwardly angled surface to translate a respective fuel cell stack along the downwardly angled surface; and the downwardly angled surface terminates against a side wall of the piping manifold.

In one aspect, the fuel cell system further includes at least two process gas seals, one process gas seal corresponding to one fuel cell each. The at least two process gas seals each comprise a first sealing surface and a second sealing surface configured to abut with the first sealing surface; the first sealing surface is provided on a side of a respective one of the at least two fuel cell stacks and the second sealing surface is provided on a respective side of the at least one piping manifold; and the at least two process gas seals are effected via the static force from the weight of the at least two fuel cell stacks acting along the downwardly angled surface, which allows the at least two fuel cell stacks to apply facial pressure against the first sealing surface and the second sealing surface.

In one aspect, the at least one piping manifold is disposed within the at least one modular enclosure at a position above the at least one fuel cell stack; the at least one process gas seal is provided on a lower surface of the at least one piping manifold or an upper surface of the at least one fuel cell stack; and in operation, the at least one process gas seal is effected via the static force from the weight of the at least one piping manifold exerting a downward force on the upper surface of the at least one fuel cell stack.

In one aspect, the fuel cell system further includes a plurality of fuel cell stacks arranged in a row. In operation, a plurality of process gas seals are effected via the static force from the weight of the at least one piping manifold exerting a downward force on the upper surface of each of the plurality of fuel cell stacks arranged in the row.

In one aspect, the at least one piping manifold is disposed within the at least one modular enclosure at a position above the at least one fuel cell stack; the at least one process gas seal comprises a first sealing surface and a second sealing surface, the first sealing surface provided on a lower surface of the at least one piping manifold and the second sealing surface provided on an upper surface of the at least one fuel cell stack; and in operation, the at least one process gas seal is effected via the static force from the weight of the at least one piping manifold exerting a downward force on the upper surface of the at least one fuel cell stack.

In one aspect, the at least one piping manifold is disposed within the at least one modular enclosure at a same height as the at least one fuel cell stack such that the at least one piping manifold is horizontally aligned with a side surface of the at least one fuel cell stack; and in operation, the at least one fuel cell stack is positioned proximate to the at least one piping manifold such that the at least one process gas seal is effected via the static force from the weight of the at least one fuel cell stack exerting a horizontal force against the at least one piping manifold.

In one aspect, the at least one process gas seal comprises a first sealing surface and a second sealing surface configured to abut with the first sealing surface; and the first sealing surface is provided on the at least one fuel cell stack and the second sealing surface is provided on the at least one piping manifold.

In one aspect, the fuel cell system further includes at least one closure plate. The top wall of the modular enclosure comprises at least one opening configured to receive the at least one closure plate; and the at least one closure plate is configured to be repeatedly and reversibly removed from the at least one opening to allow access to an interior of the modular enclosure.

In one aspect, the fuel cell system further includes an attachment point provided at an upper surface of the at least one closure plate; and a crane configured to attach to the attachment point to repeatedly and reversibly remove the at least one closure plate from the at least one opening to allow access to the interior of the modular enclosure. The attachment point may comprise a ring, a hook, or a threaded connection.

In one aspect, the fuel cell system further includes an attachment point provided at an upper surface of the at least one fuel cell stack; and a crane configured to attach to the attachment point to remove or install the at least one fuel cell stack in the modular enclosure. The attachment point may comprise a ring, a hook, or a threaded connection.

In one aspect, a plurality of closure plates are provided along the top wall of the modular enclosure; and a number of closure plates corresponds to a number of fuel cell stacks within the modular enclosure such that removal of a closure plate allows access to an individual fuel cell stack within the modular enclosure.

In one aspect a plurality of closure plates are provided along the top wall of the modular enclosure; and a number of closure plates is less than a number of fuel cell stacks within the modular enclosure such that removal of a closure plate allows access to a plurality of fuel cell stacks within the modular enclosure.

In one aspect, only one fuel cell stack is disposed within the modular enclosure; the side walls of the modular enclosure contain manifold volumes and process gas connections, the only one fuel cell stack fluidly connected to the manifold volumes and the process gas connections; the at least one piping manifold is external to the modular enclosure; and the manifold volumes are fluidly connected to the at least one piping manifold.

In one aspect, the side walls of the modular enclosure are tapered; the at least one process gas seal is affixed to a side of the only one fuel cell stack, the at least one process gas seal comprising a wedge-shaped seal angled at a same degree as the tapered side walls of the modular enclosure; and in operation, when the only one fuel cell stack is lowered into the modular enclosure, an angled surface of the wedge-shaped seal mates with the tapered side wall of the modular enclosure, and the at least one process gas seal is effected via the static force from the weight of the only one fuel cell stack against the tapered side wall.

In one aspect, at least one of the top wall, the bottom wall, or the plurality of side walls of the modular enclosure comprise insulation configured to absorb energy created during a deflagration event.

In one aspect, the fuel cell system further includes a plurality of modular enclosures, each containing at least one fuel cell stack. The plurality of modular enclosures are connected to a single piping manifold. The plurality of modular enclosures may be arranged in at least one row, the plurality of modular enclosures are arranged in at least one column, or the plurality of modular enclosures are arranged in a plurality of rows and a plurality of columns. A weight of the modular enclosures against one another is configured to dissipate energy created during a deflagration event.

In one aspect, individual fuel cell stacks may be accessed by removing at least one closure plate provided in an opening of the top wall of the modular enclosure.

In one aspect, the at least one modular enclosure is divided into a plurality of compartments, each compartment configured to receive only one fuel cell stack; side walls of each of the plurality of compartments contain manifold volumes and process gas connections; the only one fuel cell stack received in each of the plurality of compartments is fluidly connected to the manifold volumes and the process gas connections contained in the side walls; the at least one piping manifold is external to the modular enclosure; and the manifold volumes are fluidly connected to the at least one piping manifold.

In one aspect, the side walls of the plurality of compartments are tapered; the at least one process gas seal is affixed to a side of the only one fuel cell stack, the at least one process gas seal comprising a wedge-shaped seal angled at a same degree as the tapered side walls of the plurality of compartments; and in operation, when the only one fuel cell stack is lowered into a respective compartment, an angled surface of the wedge-shaped seal mates with the tapered side wall of the respective compartment, and the at least one process gas seal is effected via the static force from the weight of the only one fuel cell stack against the tapered side wall.

In one aspect, at least one wall of the modular enclosure is insulated and configured to absorb energy created during a deflagration event. In another aspect, all of the walls of the modular enclosure are insulated and configured to absorb energy created during a deflagration event.

In one aspect, the fuel cell system includes a plurality of modular enclosures, where each modular enclosure includes a plurality of fuel cell stacks. In another aspect, the fuel cell system includes a plurality of modular enclosures, where each modular enclosure includes only one fuel cell stack.

In one aspect, the fuel cell system further includes a cap on an upper surface of the at least one fuel cell stack. The cap is larger than the at least one opening in the top wall of the modular enclosure such that when the at least one fuel cell stack is lowered within the at least one opening, a seal is created using the weight of the at least one fuel cell stack.

In one aspect, a top of the modular enclosure is configured to act as a pressure relief panel during a deflagration event.

In one aspect, the modular enclosure and/or the piping manifold are placed in an excavated hole in the ground. The support from the surrounding ground is used to contain the fuel cell system during a deflagration event.

One of ordinary skill in the art would appreciate that the aspects described above are not mutually exclusive and may be combined.

These and other advantageous features will become apparent to those reviewing the disclosure and drawings.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein

FIG. 6A is an elevation view illustrating a sixth embodiment of a modular enclosure having tapered walls configured to mate with wedge-shaped seals disposed on a fuel cell stack installed in the modular enclosure and a ring attached to the fuel cell stack for lifting the fuel cell stack. FIG. 6B is an elevation view illustrating a partial installation of the fuel cell stack into the modular enclosure of FIG. 6A.

DETAILED DESCRIPTION

Figure 1:
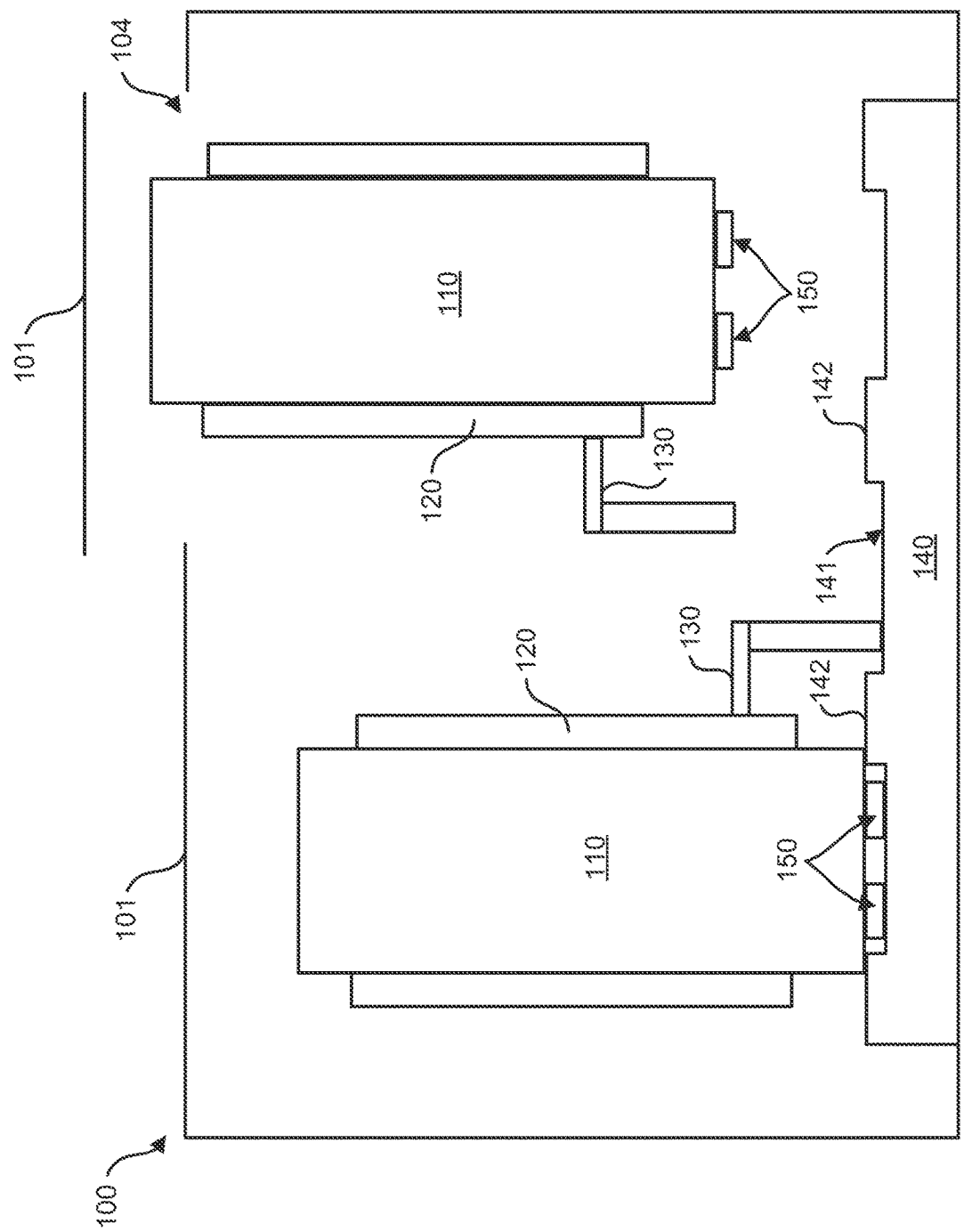
FIG. 1 is an elevation view illustrating a first embodiment of a modular enclosure including a plurality of fuel cell stacks where the weight of the fuel cell stacks is used to seal against a piping manifold below the fuel cell stacks.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to FIG. 1-8, in general, the embodiments of a fuel cell system include a plurality of modular enclosures, each enclosure including a plurality of fuel cell stacks that are electrically and fluidly connected. Each modular enclosure includes a top wall, a bottom wall, and a plurality of side walls that connect the top wall and the bottom wall and surround or close off the modular enclosure on all sides. The fuel cell stacks may be, for example, high-temperature fuel cell stacks such as Molten Carbonate Fuel Cells (MCFC) stacks, which operate at approximately 650° C. The fuel cell stacks may be arranged in series or in parallel. In-situ process gas seals such as compressive seals, radial seals, and/or tapered seals may be provided between the fuel cell stack and a piping manifold for process gases. The piping manifold includes at least one inlet configured to receive at least one exhaust process gas from a fuel cell stack and an outlet configured to supply at least one process gas to the fuel cell stack. The process gas may be for example, oxidant gas, fuel gas, cooling gas, inert gases for system protection, etc. In some aspects, liquids for processes may also be routed through the piping manifold. This enables the use of somewhat porous and compliant materials (e.g., porous ceramic materials, ceramic materials, or metallic seals), for effective in-situ seals. The seals are effected via static force from the weight of the fuel cell stacks compressing a gasket or ring seal, thereby eliminating the need for additional mechanical means (e.g., bolting) to provide sealing.

In each of the embodiments described below, the fuel cell system may be erected and installed in the field by combining a plurality of modular enclosures. Each of the modular enclosures may be erected at a manufacturing facility and shipped to the field for installation, or each of the modular enclosures may be erected and installed in the field. In each of the embodiments described below, modular enclosures are sized such that only a partial shutdown of a fuel cell system is required during repair or replacement of an individual fuel cell stack. When the fuel cell stacks of one of the modular enclosures is taken offline, the fuel cell stacks of the remaining modular enclosures may continue to operate or may be taken offline. The embodiments of the fuel cell systems lower the cost of the fuel cell stack design, decrease the size of the modular enclosure, and reduce the costs and problems associated with shipping such large fuel cell systems. With field installed/replaceable stacks, shipping and transportation requirements such as dynamic shipping loads and permitting for oversized modules are eliminated.

The fuel cell systems may be applied to any power system, and are therefore, not limited by size or power output. Although the embodiments of FIGS. 1-8 illustrate a single modular enclosure, the concepts disclosed herein are not limited in this regard. By changing a number of modular enclosures in the fuel cell system, fuel cell systems can be scaled to whatever size is required by a power system. Although the embodiments of FIGS. 1-5 and 8 illustrate a single modular enclosure including two fuel cell stacks, the concepts disclosed herein are not limited in this regard. By changing a number of fuel cell stacks within each modular enclosure, fuel cell systems can be scaled to whatever size is required by a power system.

Referring to FIG. 1, in a first embodiment, a modular enclosure 100 includes two fuel cell stacks 110 and a piping manifold 140. Each fuel cell stack 110 includes a plurality of manifolds 120 and at least one process gas pipe 130 configured to fluidly connect the fuel cell stack 110 to the piping manifold 140. An upper surface of the piping manifold 140 includes a plurality of recesses 141 defined by projecting portions 142. The projecting portions 142 are configured to function as hard stops upon which a lower surface of the fuel cell stack 110 sits.

The vertical weight of the fuel cell stacks 110 is used to seal against the piping manifold 140. In some aspects (as illustrated in FIG. 1), the lower surface of the fuel cell stack 110 includes at least one sealing surface 150. In other aspects, the upper surface of the piping manifold 140 may include at least one sealing surface 150. In even further aspects, each of the lower surface of the fuel cell stack 110 and the upper surface of the piping manifold 140 may include at least one sealing surface 150. Providing the sealing surface on the lower surface of the fuel cell stack may help to keep the sealing surface clean, but requires the sealing surface to be fixed against the fuel cell stack. Providing the sealing surface on the piping manifold allows for visual confirmation of seal integrity and also allows gravity to hold the sealing surface in place until it is pressurized. Either configuration may be used, depending on the sensitivity of the sealing surface material and the environmental conditions (e.g. cleanliness) within which the fuel cell stack will be placed. When the lower surface of the fuel cell stack 110 rests upon the projecting portions 142 of the piping manifold 140, the vertical weight of the fuel cell stack 110 causes the sealing surface 150 to apply a predetermined facial pressure to the recess 141 of the piping manifold 140. The seals comprised of the sealing surfaces 150 may be gas seals such as compressive seals (e.g., spring bellows), radial seals, and/or tapered seals provided between the fuel cell stack 110 and the piping manifold 140.

In some aspects, the total weight of the fuel cell stack may be applied across the sealing surface 150. In other aspects, the force on the sealing surfaces may be reduced by having the structure support some of the weight. As discussed above, the fuel cell stack 110 rests upon the projecting portions 142 such that a gap exists between the lower surface of the fuel cell stack 110 and the lower surface of the recess 141. The gap has a predetermined height x. The sealing surface 150 attached to the lower surface of the fuel cell stack 110 has a height y, that is greater than the height x. With this configuration, when the fuel cell stack 110 rests upon the projecting portions 142, the sealing surface 150 is compressed by a pre-determined amount (e.g., 0.5y) such that a desired force can be applied (some percentage of the weight) rather than the entire weight of the fuel cell stack 110. Assuming that the sealing surfaces 150 have a spring constant k, a desired force can be created by setting a height of gap (e.g., the recess 141) so that the deflection (e.g., 0.5y×k) creates a certain force using Hooke's Law, where force=k×displacement.

A closure plate 101 is used to close an overhead opening 104 in the top of the modular enclosure 100 disposed above the fuel cell stack 110 after the fuel cell stack 110 is installed. The modular enclosure 100 may have a plurality of overhead openings 104 and closure plates 101. For example, the modular enclosure 100 may include one overhead opening 104 and closure plate 101 for each fuel cell stack 110 in the modular enclosure 100 (as illustrated). In another example, the modular enclosure 100 may include one overhead opening 104 and closure plate 101 disposed above a group of fuel cell stacks 110.

The closure plates 101 are repeatedly and reversibly removable and configured to allow access to individual fuel cell stacks 110. During operation, overhead openings 104 in the modular enclosure 100 may be closed or secured to maintain the temperature within the modular enclosure 100, e.g., constant, or above/below the ambient temperature surrounding the modular enclosure 100. The individual fuel cell stacks 110 may be accessed, for example, by a crane configured to lift a closure plate 101, access and remove an individual fuel cell stack 110, and transport the individual fuel cell stack 110 to a remote location for maintenance, repair or replacement. The crane may also be used to insert and the individual fuel cell stack 110 into the modular enclosure 100.

Figure 2:
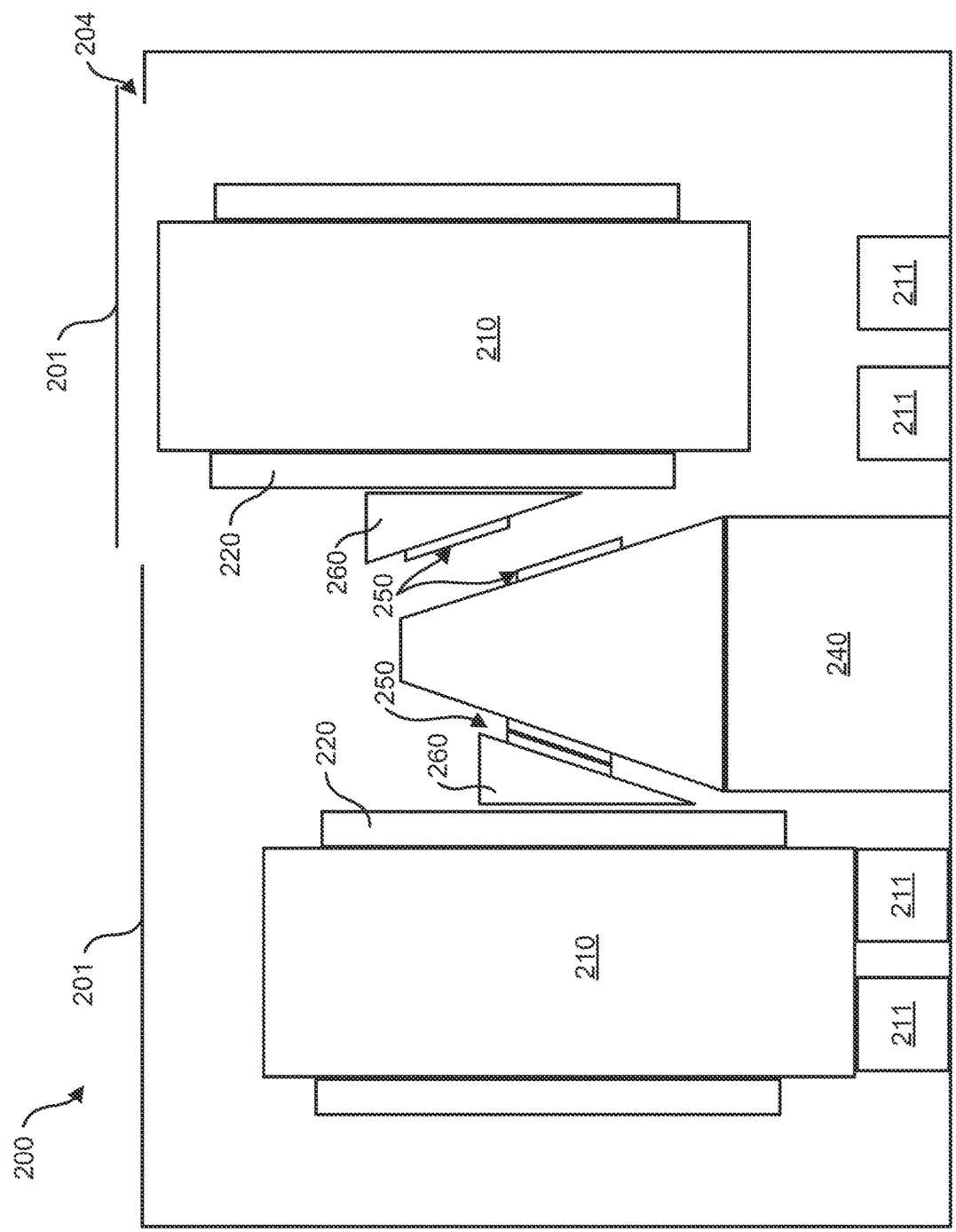
FIG. 2 is an elevation view illustrating a second embodiment of a modular enclosure including a plurality of fuel cell stacks having an angular extension where the weight of the fuel cell stacks is used to seal against a piping manifold with angled surfaces.

Referring to FIG. 2, in a second embodiment, a modular enclosure 200 includes two fuel cell stacks 210 and a piping manifold 240. Each fuel cell stack 210 includes a plurality of manifolds 220 and an angled extension 260 that extends from the manifold 220 and fluidly connects the fuel cell stack 210 to the piping manifold 240. The angled extension 260 is hollow and may be made, for example, out of pipe, sheet metal or plate formed into a duct, a cast hollow duct, or a block of material machined or bored to be hollow. In some aspects, the angled extension 260 is connected to an exterior of the manifold via any known method (e.g., welding), while in other aspects, the angled extension 260 is integrally formed with the manifold 220 (i.e., the manifold 220 and the angled extension 260 are made of a single piece).

The piping manifold 240 is disposed between at least two fuel cell stacks 210. At least a portion of the walls of the piping manifold 240 that face the fuel cell stacks 210 is angled. The angle selected is based on a required facial pressure and the weight of the fuel cell stack 210. In some aspects (not illustrated), the entire wall of the piping manifold 240 may be angled (e.g., a pyramidal piping manifold).

A surface of the angled extension 260 facing an angled wall of the piping manifold 240 includes a sealing surface 250 configured to interface with a sealing surface 250 provided on the angled wall of the piping manifold 240. A vertical cross-section of the angled extension 260 may be, for example, a right triangle oriented such that the sealing surface 250 is provided on the hypotenuse thereof. The piping manifold 240 includes at least one sealing surface 250 for each fuel cell stack 210 configured to be connected to the piping manifold 240. The angled wall of the piping manifold 240 and the surface of the angled extension 260 facing the angled wall of the piping manifold 240 are angled at a same degree (i.e., a slope of the angled wall of the piping manifold 240 is the same as a slope of the surface of the angled extension 260 facing the angled wall of the piping manifold 240). Due to the provision of the angled walls, at least a portion of a vertical cross-section of the piping manifold is trapezoidal or triangular. The vertical weight of the fuel cell stack 210 is used to seal against the angled walls of the piping manifold 240. In particular, when the fuel cell stack 110 rests upon the stack base 211, the vertical weight of the fuel cell stack 210 causes the sealing surface 250 of the angled extension 260 and the sealing surface 250 of the angled wall of the piping manifold 240 to interface and apply a predetermined facial pressure upon one another, thereby sealing the fuel cell stack 210 against the piping manifold 240. The seals comprised of the sealing surfaces 250 may be gas seals such as compressive seals, radial seals, and/or tapered seals provided between the fuel cell stack 210 and the piping manifold 240. For example, the seals may be spring bellows, gaskets or ring seals.

A closure plate 201 is used to close an overhead opening 204 in the top of the modular enclosure 200 disposed above the fuel cell stack 210 after the fuel cell stack 210 is installed. The modular enclosure 200 may have a plurality of overhead openings 204 and closure plates 201. For example, the modular enclosure 200 may include one overhead opening 204 and closure plate 201 for each fuel cell stack 210 in the modular enclosure 200 (as illustrated). In another example, the modular enclosure 200 may include one overhead opening 204 and closure plate 201 disposed above a group of fuel cell stacks 210.

The closure plates 201 are repeatedly and reversibly removable and configured to allow access to individual fuel cell stacks 210. During operation, overhead openings 204 in the modular enclosure 200 may be closed or secured to maintain the temperature within the modular enclosure 200, e.g., constant, or above/below the ambient temperature surrounding the modular enclosure 200. The individual fuel cell stacks 210 may be accessed, for example, by a crane configured to lift a closure plate 201, access and remove an individual fuel cell stack 210, and transport the individual fuel cell stack 210 to a remote location for maintenance, repair or replacement. The crane may also be used to insert and the individual fuel cell stack 210 into the modular enclosure 200.

Figure 3:
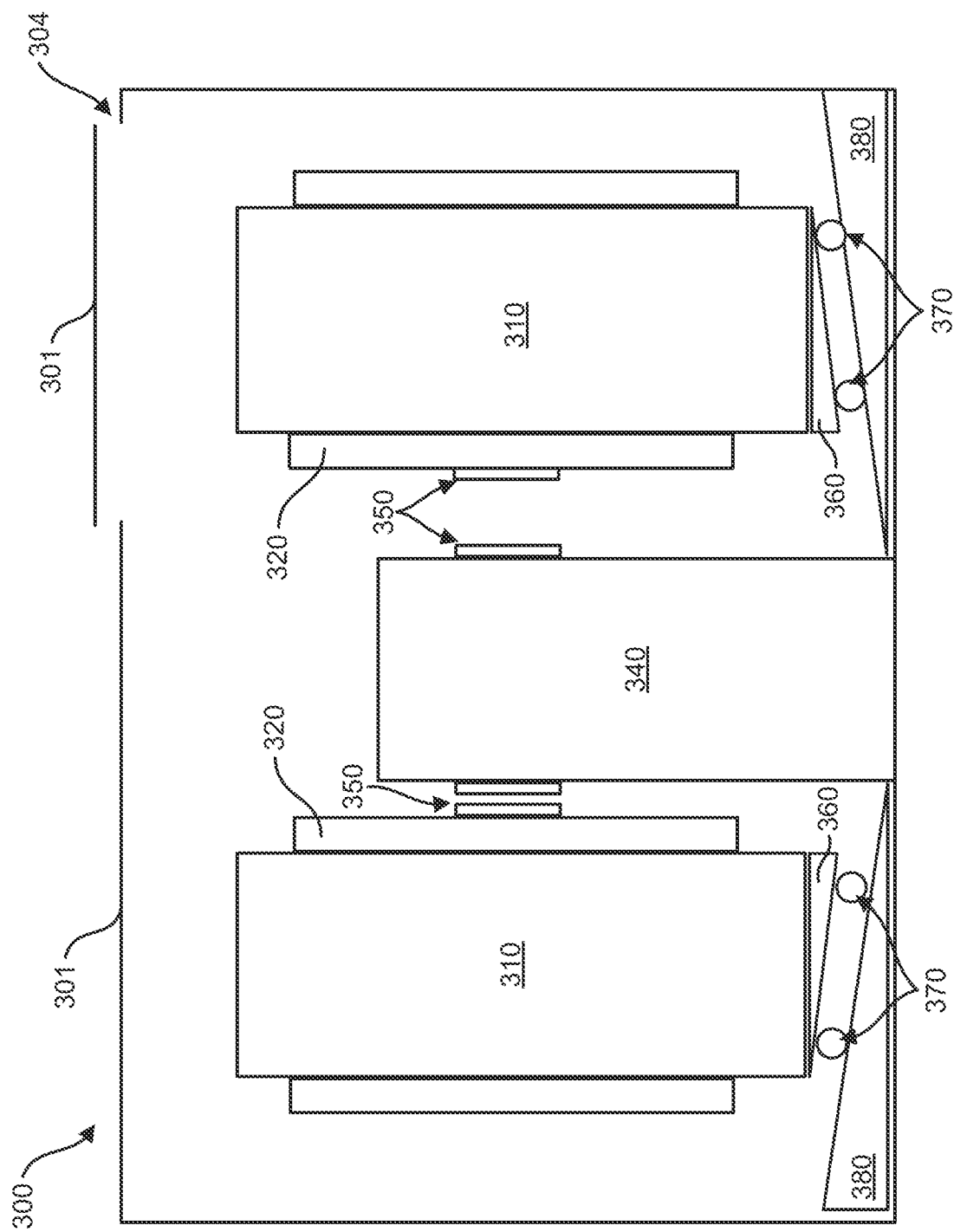
FIG. 3 is an elevation view illustrating a third embodiment of a modular enclosure including a plurality of fuel cell stacks where each fuel cell stack is placed on a plurality of wheels configured to slide on an inclined plane at a base of the modular enclosure, and a weight of the fuel cell stack acting along the inclined plane allows for sealing against a piping manifold.

Referring to FIG. 3, in a third embodiment, a modular enclosure 300 includes two fuel cell stacks 310 and a piping manifold 340. Each fuel cell stack 310 includes a plurality of manifolds 320 and an angled extension 360 that extends from a lower surface of the fuel cell stack 310. In some aspects, the angled extension 360 is connected to the lower surface of the fuel cell stack 310 via any known method (e.g., welding), while in other aspects, the angled extension 360 is integrally formed with the fuel cell stack 310 (i.e., the fuel cell stack 310 and the angled extension 360 are made of a single piece). The manifold 320 is fluidly connected to the piping manifold 340 via a hollow seal (discussed in further detail below).

A base of the modular enclosure 300 includes a downwardly angled surface 380 such that a height of a plane formed by the angled surface 380 is greater at a location distal to the piping manifold 340 than the height of the plane at a location proximal to the piping manifold 340. The angled surface 380 terminates against a side wall of the piping manifold 340. The angled surface of the angled extension 360 faces the angled surface 380 and is angled in a direction opposite to the angled surface 380 such that the angled extension 360 and the angled surface 380 are parallel. In other words, the angled surface of the angled extension 360 is upwardly angled. The angled surface 380 and the angled extension 360 are angled at a same degree (i.e., a slope of the angled surface 380 is the same as a slope of the angled extension 360). The angle is selected based on the required facial pressure and the weight of the fuel cell stack 310.

A plurality of wheels 370 are connected to the angled extension 360 and configured to roll upon the angled surface 380 to move the fuel cell stack 310. Although two wheels 370 are illustrated, the concepts disclosed herein are not limited in this regard. Any number of wheels 370 may be utilized, provided the wheels 370 are capable of supporting the weight of the fuel cell stack 310. A lower friction sliding surface can be used in lieu of the wheels 370.

The manifold 320 includes a sealing surface 350 at a side configured to face the pining manifold 340. The piping manifold 340 includes at least one sealing surface 350 for each fuel cell stack 310 configured to be connected to the piping manifold 340. The weight of the fuel cell stack 310 acting along the angled surface 380 allows the fuel cell stack 310 to apply facial pressure against the sealing surfaces 350, thereby sealing the fuel cell stack 310 against the piping manifold 340. The seals comprised of the sealing surfaces 350 may be gas seals such as compressive seals, radial seals, and/or tapered seals provided between the fuel cell stack 310 and the piping manifold 340. For example, the seals may be spring bellows, gaskets or ring seals.

A closure plate 301 is used to close an overhead opening 304 in the top of the modular enclosure 300 disposed above the fuel cell stack 310 after the fuel cell stack 310 is installed. The modular enclosure 300 may have a plurality of overhead openings 304 and closure plates 301. For example, the modular enclosure 300 may include one overhead opening 304 and closure plate 301 for each fuel cell stack 310 in the modular enclosure 300 (as illustrated). In another example, the modular enclosure 300 may include one overhead opening 304 and closure plate 301 disposed above a group of fuel cell stacks 310.

The closure plates 301 are repeatedly and reversibly removable and configured to allow access to individual fuel cell stacks 310. During operation, overhead openings 304 in the modular enclosure 300 may be closed or secured to maintain the temperature within the modular enclosure 300, e.g., constant, or above/below the ambient temperature surrounding the modular enclosure 300. The individual fuel cell stacks 310 may be accessed, for example, by a crane configured to lift a closure plate 301, access and remove an individual fuel cell stack 310, and transport the individual fuel cell stack 310 to a remote location for maintenance, repair or replacement. The crane may also be used to insert and the individual fuel cell stack 310 into the modular enclosure 300.

In FIGS. 2 and 3, the piping manifold 240, 340 is disposed between two fuel cell stacks 210, 310. However, the concepts disclosed herein are not limited in this regard. In some aspects, the modular enclosure may include only one fuel cell stack. In other aspects, the modular enclosure may include more than two fuel cell stacks. The opposing structure just needs to be robust enough to counteract the force, in order to effect the seal.

Figure 4:
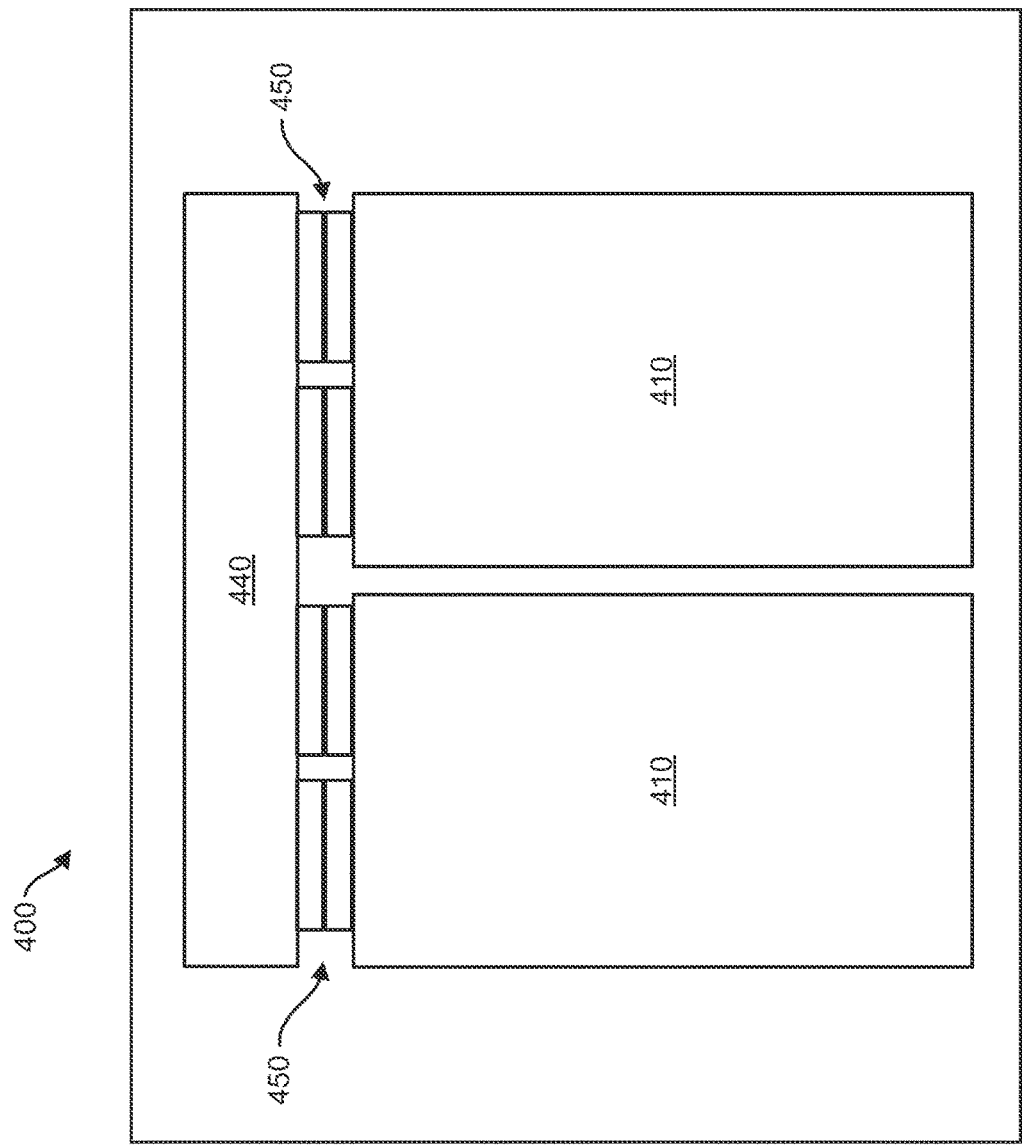
FIG. 4 is an elevation view illustrating a fourth embodiment of a modular enclosure including a plurality of fuel cell stacks where the weight of a piping manifold above the fuel cell stacks is used to seal against the fuel cell stacks.

Referring to FIG. 4, in a fourth embodiment, a modular enclosure 400 includes two or more fuel cell stacks 410 and a piping manifold 440. In one aspect, the fuel cell stacks 410 are arranged in a single row (for example, two fuel cell stacks 410 arranged in two columns and one row). In another aspect, the fuel cell stacks 410 are arranged in multiple rows (for example, two fuel cell stacks 410 arranged in two columns, where fuel cell stacks 410 in a column are stacked vertically with respect to one another). Although not illustrated, each fuel cell stack 410 includes a plurality of manifolds that are fluidly connected to the piping manifold 440.

In the fourth embodiment, the piping manifold 440 is disposed at a height above the fuel cell stacks 410. The vertical weight of the piping manifold 440 is used to seal against the fuel cell stacks 410. In some aspects, the lower surface of the piping manifold 440 may include at least one sealing surface 450. In other aspects, the upper surface of the fuel cell stack 410 may include at least one sealing surface 450. In even further aspects, each of the lower surface of the piping manifold 440 and the upper surface of the fuel cell stack 410 may include at least one sealing surface 450.

The fuel cell stacks 410 are installed such that a lower surface of the piping manifold 440 exerts a downward force on the upper surface of the fuel cell stack 410. Thus, the vertical weight of the piping manifold 440 causes the sealing surface 450 to apply a predetermined facial pressure, thereby sealing the fuel cell stack 410 against the piping manifold 440. The seals comprised of the sealing surfaces 450 may be gas seals such as compressive seals, radial seals, and/or tapered seals provided between the fuel cell stack 410 and the piping manifold 440. For example, the seals may be spring bellows, gaskets or ring seals.

In order to access an individual fuel cell stack 410, the piping manifold 440 must first be removed.

In another aspect of this embodiment, a fuel cell system may have multiple modular enclosures 400, each including a plurality of fuel cell stacks 410 where the weight of a piping manifold 440 above the fuel cell stacks 410 is used to seal against the fuel cell stacks 410.

Figure 5:
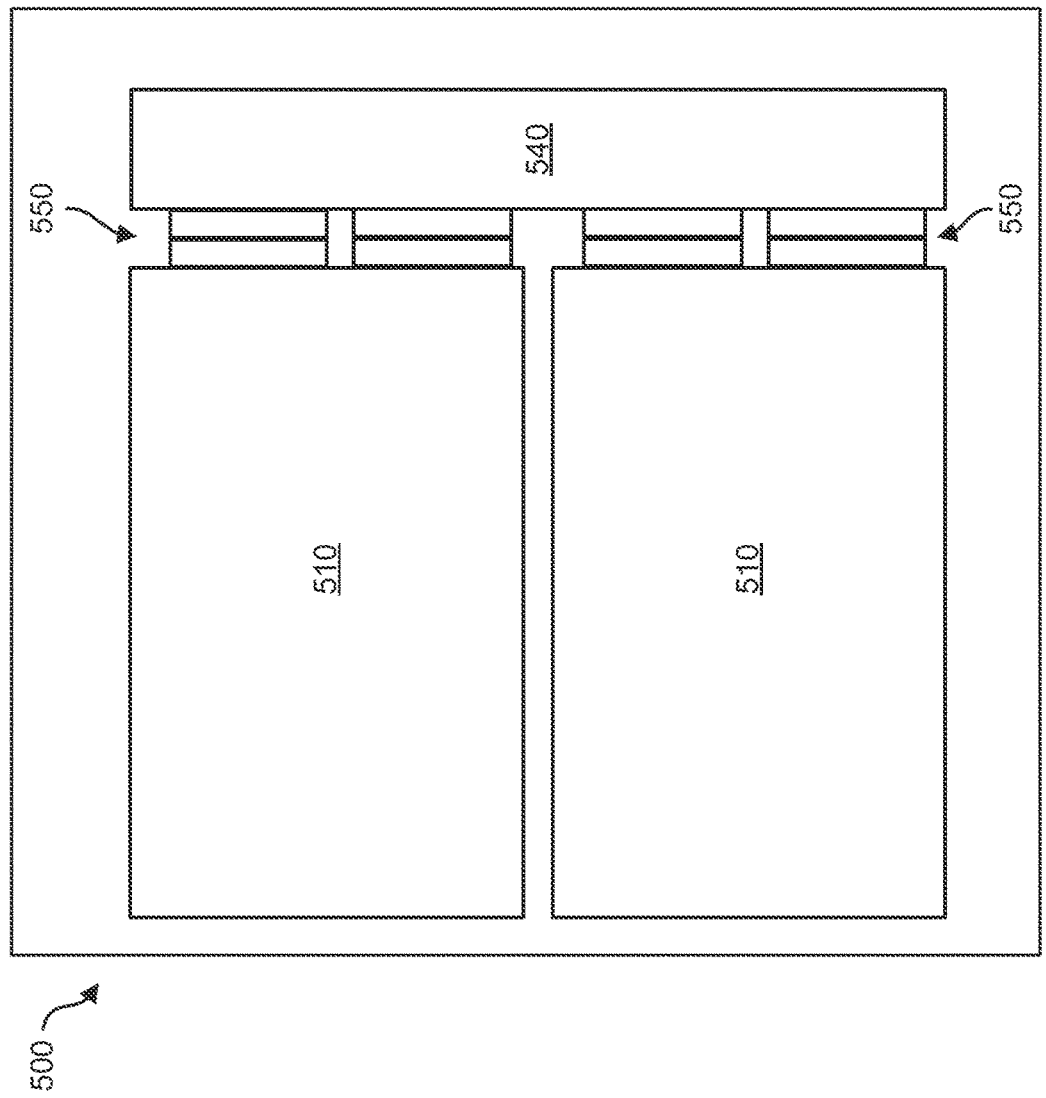
FIG. 5 is an elevation view illustrating a fifth embodiment of a modular enclosure including a plurality of horizontal fuel cell stacks with manifolds mounted between them and where a piping manifold is horizontally aligned with the fuel cell stacks and the fuel cell stacks are thrust against the piping manifold to seal against a piping manifold.

Referring to FIG. 5, in a fifth embodiment, a modular enclosure 500 includes two or more fuel cell stacks 510 and a piping manifold 540. In one aspect, the fuel cell stacks 510 are arranged in a single row (for example, two fuel cell stacks 510 arranged in two columns and one row). In another aspect, the fuel cell stacks 510 are arranged in multiple rows (for example, two fuel cell stacks 510 arranged in two columns, where fuel cell stacks 510 in a column are stacked vertically with respect to one another). Although not illustrated, each fuel cell stack 510 includes a plurality of manifolds that are fluidly connected to the piping manifold 540. In this embodiment, a plurality of horizontal fuel cell stacks 510 have manifolds mounted between them. The piping manifold 540 is horizontally aligned with the fuel cell stacks 510 and the fuel cell stacks 510 are thrust against the piping manifold 540 to seal against the piping manifold 540. The force of the horizontal thrust (e.g., static force applied by a cantilever, spring, thrusting mechanism, etc.) seals the fuel cell stacks 510 to the piping manifolds 540.

In the fifth embodiment, the piping manifold 540 is disposed at a same height as the fuel cell stacks 510. For example, as illustrated in FIG. 5, the piping manifold 540 may be disposed behind the fuel cell stacks 510, such that the piping manifold 540 is horizontally aligned with a side surface of the fuel cell stack 510. In some aspects, a surface of the piping manifold 540 configured to face a side surface of the fuel cell stack 510 may include at least one sealing surface 550. In other aspects, the side surface of the fuel cell stack 510 may include at least one sealing surface 550. In even further aspects, both the surface of the piping manifold 540 configured to face a side surface of the fuel cell stack 510 and the side surface of the fuel cell stack 510 may include at least one sealing surface 550.

The weight of the fuel cell stacks 510 is used to seal against the piping manifold 540. In particular, during installation, the fuel cell stacks 510 are positioned proximate to the piping manifold 540 such that the fuel cell stack 510 exerts a horizontal force against the sealing surface 550 and the piping manifold 540 (i.e., the fuel cell stack 510 applies a predetermined facial pressure to the sealing surface 550 and the piping manifold 540), thereby forming a seal. The seals comprised of the sealing surfaces 550 may be comprised of gas seals such as compressive seals, radial seals, and/or tapered seals provided between the fuel cell stack 510 and the piping manifold 540. For example, the seals may be spring bellows, gaskets or ring seals.

In order to access individual fuel cell stacks 510, the fuel cell stacks 510 would have to be disconnected from the piping manifold 540, for example, by unbolting or sliding the fuel cell stack 510 (to the left) and then lifting the fuel cell stacks 510 out. If the fuel cell stacks 510 are arranged in multiple rows (i.e., if fuel cell stacks 510 are vertically stacked upon each other), to access a lower fuel cell stack 510, the upper fuel cell stack(s) 510 must be removed first. In other aspects, the fuel cell stacks 510 may be mounted in rows of a rack that allows removal of a fuel cell stack 510 by sliding the fuel cell stack 510 out of its corresponding row, without having to remove any fuel cell stacks 510 disposed above the fuel cell stack 510 to be removed. In other aspects, upper fuel cell stack(s) 510 may be temporarily supported by jacking that would allow for removal of a lower fuel cell stack 510. Even when supported by jacking, the weight of the bottom fuel cell stack 510 may still be used to seal against the piping manifold 540.

Figures 7A, 7B:
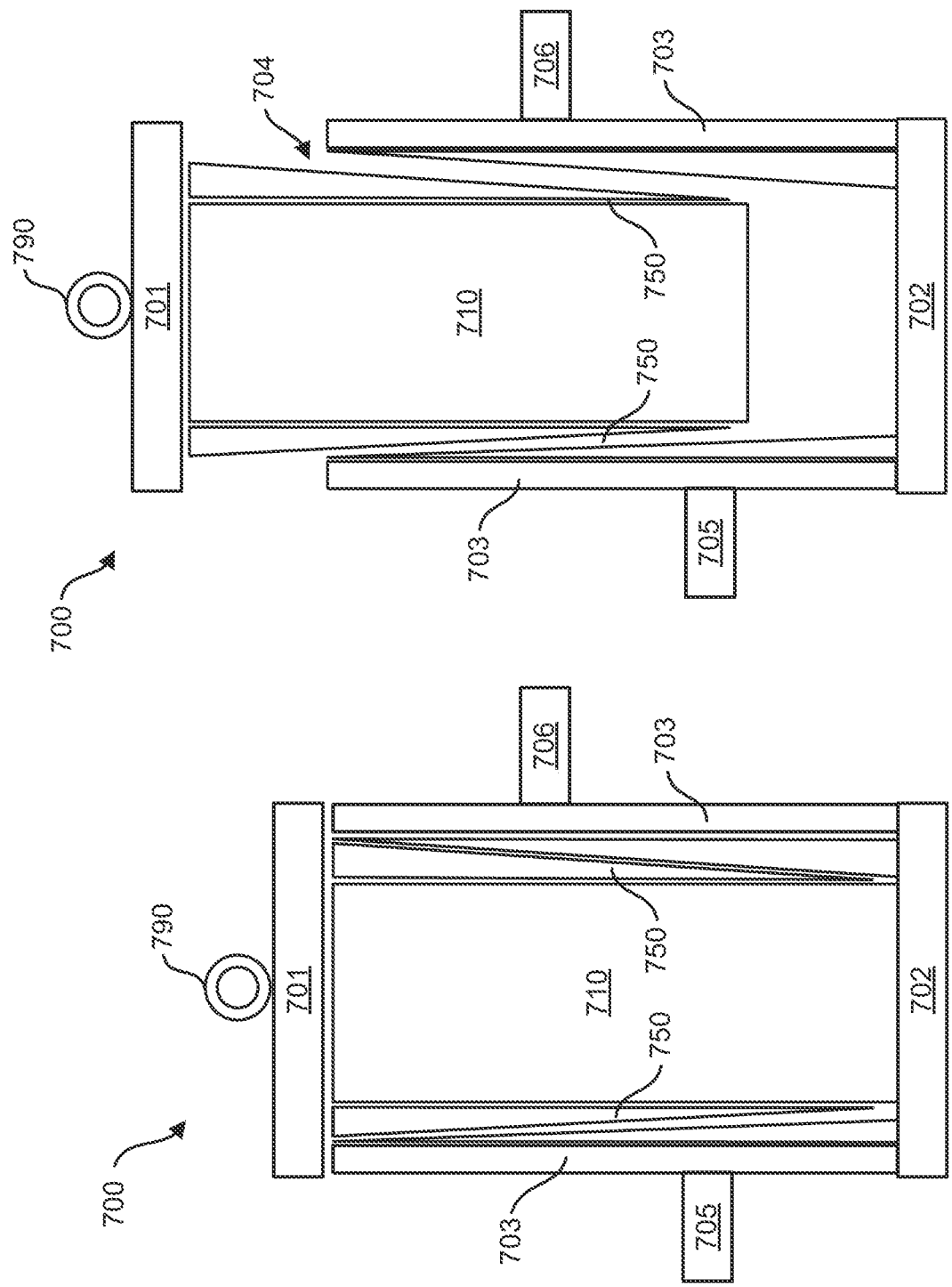
FIG. 7A is an elevation view illustrating a seventh embodiment of a modular enclosure having tapered walls configured to mate with wedge-shaped seals disposed on the fuel cell stack installed in the modular enclosure and a ring for lifting the fuel cell stack being integrated into the fuel cell stack from above a closure plate.
FIG. 7B is an elevation view illustrating a partial installation of the fuel cell stack into the modular enclosure of FIG. 7A.

Referring now to FIGS. 6A (and 6B) and 7A (and 7B), a modular enclosure 600 includes a single fuel cell stack 610, and a modular enclosure 700 includes a single fuel cell stack 710. FIGS. 6A and 7A illustrate the modular enclosures 600, 700 with a fuel cell stack 610, 710 installed therein, while FIGS. 6B and 7B illustrate an incomplete installation of the fuel cell stack 610, 710 into the modular enclosure 600, 700.

A closure plate 601, 701 is used to close an overhead opening 604, 704 in the top of the modular enclosure 600, 700 disposed above the fuel cell stack 610, 710 after the fuel cell stack 610, 710 is installed. The closure plate 601, 701 is repeatedly and reversibly removable and configured to allow access to the single fuel cell stack 610, 710 within the modular enclosure 600, 700. During operation, the overhead opening 604, 704 in the modular enclosure 600, 700 may be closed or secured to maintain the temperature within the modular enclosure 600, 700, e.g., constant, or above/below the ambient temperature surrounding the modular enclosure 600, 700. The individual fuel cell stack 610, 710 may be accessed, for example, by a crane configured to lift the closure plate 601, 701, access and remove the individual fuel cell stack 610, 710, and transport the individual fuel cell stack 610, 710 to a remote location for maintenance, repair or replacement. The crane may also be used to insert and the individual fuel cell stack 610, 710 into the modular enclosure 600, 700.

In the modular enclosure 600, a ring 690 is attached to the fuel cell stack 610 for lifting the fuel cell stack 610. The ring 690 can also be used as the main connection point used to extract electrical power from the fuel cell stack 610 after it is installed and operating. Although the lifting point is represented by the ring 690, the concepts disclosed herein are not limited in this regard. Other forms may be used such as a hook or a threaded connection.

In the modular enclosure 700, a ring 790 is attached to an upper surface of the closure plate 701 for lifting the closure plate 701 and the fuel cell stack 710 (for example, with a crane). In one aspect, the ring 790 is attached to the closure plate 701 directly, which is then attached to the fuel cell stack 710. In another aspect, the ring 790 is attached to the fuel cell stack 710 through the closure plate 701, so that the ring 790 can also be used as the main connection point used to extract electrical power from the fuel cell stack 710 after it is installed and operating. Although the lifting point is represented by the ring 790, the concepts disclosed herein are not limited in this regard. Other forms may be used such as a hook or a threaded connection.

The modular enclosure 600, 700 includes a closure plate 601, 701, a base 602, 702, and tapered side walls 603, 703. The tapered side walls 603, 703 contain manifold volumes and process gas connections. Inlet port 605, 705 and outlet port 606, 706 are configured to fluidly connect the manifold volumes of the tapered side walls 603, 703 to a piping manifold (not illustrated) external to the modular enclosure 600, 700 or within the tapered side walls 603, 703 of the modular enclosure 600, 700.

The fuel cell stack 610, 710 may be a four-sided fuel cell stack, with wedge-shaped seals 650, 750 affixed to each side. The seals 650, 750 are gas seals such as compressive seals, and/or tapered seals provided between the fuel cell stack 610, 710 and the tapered walls 603, 703 housing the manifolds.

The angled surfaces of the wedge-shaped seals 650, 750 are angled at a same degree as the tapered side walls 603, 703 of the modular enclosure 600, 700 (i.e., a slope of the angled surfaces of the wedge-shaped seals 650, 750 is the same as a slope of the surface of the tapered side walls 603, 703 of the modular enclosure 600, 700). When the fuel cell stack 610, 710 is lowered into the modular enclosure 600, 700, the angled surfaces of the wedge-shaped seals 650, 750 mate with the tapered side walls 603, 703 of the modular enclosure 600, 700. The weight of the fuel cell stack 610, 710 forces the seals 650, 750 against a face of the fuel cell stack 610, 710 and tightens the fuel cell stack 610, 710 against the tapered side walls 603, 703.

In other aspects of the sixth and seventh embodiments, the fuel cell stack 610, 710 includes manifolds with tapered outer walls and seals 650, 750. When the manifolds include tapered outer walls, the seals 650, 750 may be wedge-shaped seals or non-wedge-shaped seals as illustrated in the previous embodiments. Instead of being provided within the tapered walls 603, 703 of the modular enclosure 600, 700, the manifolds are provided on the sides of the fuel cell stack 610, 710. The fuel cell stack 610, 710 is lowered into the modular enclosure 600, 700 having tapered side walls 603, 703. The weight of the fuel cell stack 610, 710 pushes the manifold perimeter edges and seals to be compressed against the stack faces.

While the outer walls of the manifolds are tapered, an inner wall of the manifold may or may not be tapered. The outer wall and the inner wall of the manifold define a gas flow area that may have any shape.

In alternative aspects of the sixth and seventh embodiments (not illustrated), the modular enclosure 600, 700 may include a plurality of electrically and fluidly connected fuel cell stacks 610, 710. In these embodiments, the modular enclosure 600, 700 may be compartmentalized (i.e., one compartment per fuel cell stack), and each of the compartments includes tapered side walls 603, 703 configured to mate with the wedge-shaped seals 650, 750 of the fuel cell stacks 610, 710. In other words, the modular enclosure 600, 700 can be made up of multiple volumes, each configured to hold a single fuel cell stack 610, 710 and having manifolds integrated into the tapered side walls 603, 703 of each volume. This configuration is similar to an egg crate arrangement.

In each of the embodiments described above, the fuel cell system includes a piping manifold for process gases that is installed on a structural base or a structure disposed above the fuel cell stacks. The piping manifold may be installed at a customer site. The fuel cell stacks and walls of the modular enclosure housing the fuel cell stacks may be added at the customer site and sealed by gravity as described above.

In each of the embodiments described above, the modular enclosure includes a base, side walls, and a full or partial roof (i.e., upper surface). The roof of the modular enclosure may include openings or removable sections configured to allow access to individual fuel cell stacks. The individual fuel cell stacks may be accessed, for example, by a crane configured to access an individual fuel cell stack transport the individual fuel cell stack to a location where it can be removed from the modular enclosure for maintenance, repair or replacement. The crane may also be used to insert the individual fuel cell stack into the modular enclosure. Fuel cell stacks are installed into the openings or removable sections of the roof of modular enclosure, sealing with the connections by gravity as described above.

Figure 8:
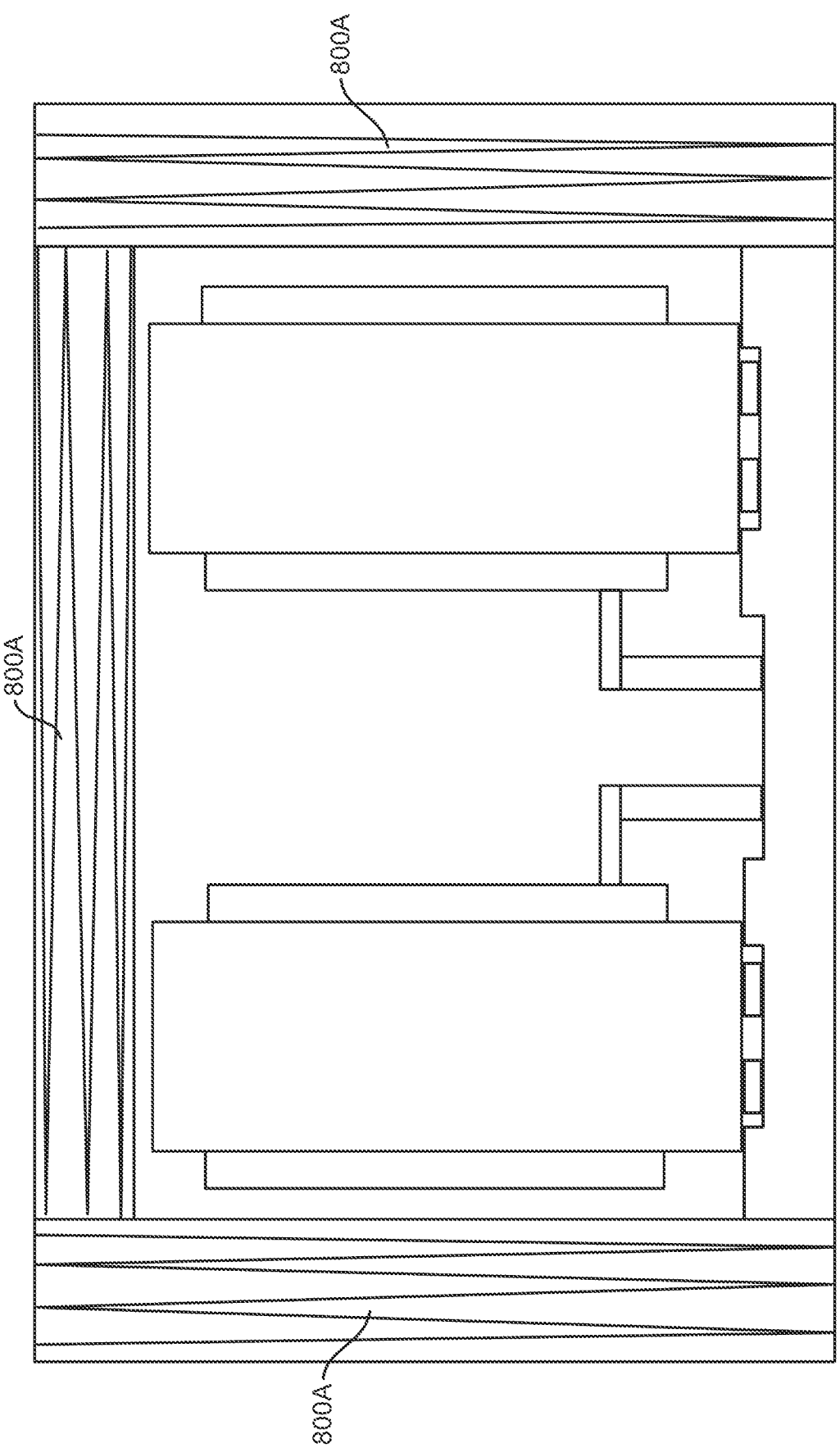
FIG. 8 is an elevation view of an insulated modular enclosure including a plurality of fuel cell stacks where the weight of the fuel cell stacks is used to seal against a piping manifold below the fuel cell stacks.

In each of the embodiments described above, the walls 800A of the modular enclosure may be insulated to absorb the energy created during a deflagration event, as illustrated in FIG. 8. Although the modular enclosure 100 is illustrated in FIG. 8, the concepts disclosed herein are not limited in this regard. Any of the modular enclosures described above may include insulated walls. In FIG. 8, only the roof and the side walls of the modular enclosure are insulated, but the concepts disclosed herein are not limited in this regard. The modular enclosure may also include an insulated base. In some aspects, only the side walls of the modular enclosure are insulated. In other aspects, only the roof of the modular enclosure is insulated. In even further aspects, only the roof and the base of the modular enclosure are illustrated.

In each of the embodiments described above, the roof of the modular enclosure may act as a pressure relief panel during a deflagration event.

In each of the embodiments described above, the modular enclosure (including the fuel cell stacks and piping manifold) may be placed in an excavated hole in the ground. The support from the surrounding ground may be used to contain the fuel cell system in the event of deflagration.

In some aspects, the top of the fuel cell stack may be larger than an opening in an upper surface of the modular enclosure that is configured to receive the fuel cell stack. Alternatively, an upper surface of the fuel cell stack may include a cap that is larger than an opening in an upper surface of the modular enclosure that is configured to receive the fuel cell stack (similar to the closure plate 701 in FIGS. 7A and 7B). Thus, when the fuel cell stack is placed into the modular enclosure, a seal is formed using the fuel cell stack weight. The modular enclosure may include tapered seals (as illustrated in FIGS. 7A and 7B), or may not include seals if there is some concern about "competition" for the available force (weight) used for sealing the cap versus the sides.

In each of the embodiments described above, the plurality of fuel cell stacks may be erected and installed in the field, thereby eliminating the costs and problems associated with shipping such large fuel cell arrangements. In addition, in each of the embodiments described above, individual fuel cell stacks may be accessed and replaced in the field. This eliminates the need to remove and/or transport an entire module (i.e., the entire enclosure containing the plurality of fuel cell stacks) in order to perform maintenance, repair or replacement of a single fuel cell stack. Because the fuel cell stacks can be erected, installed and replaced in the field, shipping, piping, insulation, replacement and field servicing costs can be reduced, and the footprint of the power plant can also be reduced. Moreover, the seals are effected via static force from the weight of the fuel cell stacks compressing a gasket or ring seal, thereby eliminating the need for additional mechanical means (e.g., bolting) to provide sealing.

Figure 9B:
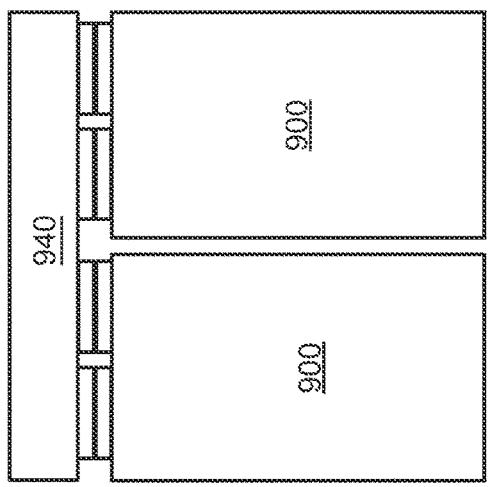
FIG. 9B is an elevation view illustrating a fuel cell system including a plurality of modular enclosures where the weight of a piping manifold above the modular enclosures is used to seal against the modular enclosures.
Figure 9C:
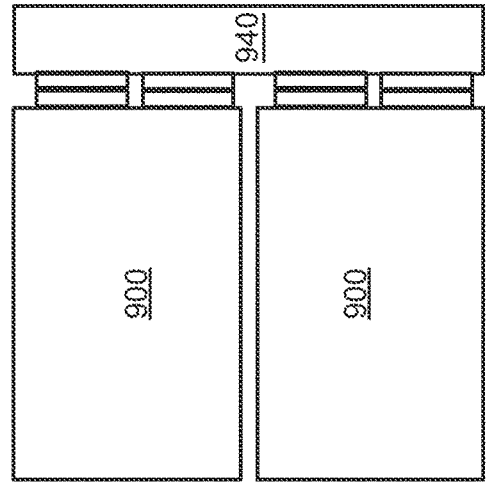
FIG. 9C is an elevation view illustrating a fuel cell system including a plurality of horizontal modular enclosures, where a piping manifold is horizontally aligned with the modular enclosures and the modular enclosures are thrust against the piping manifold to seal against a piping manifold.
Figure 9A:
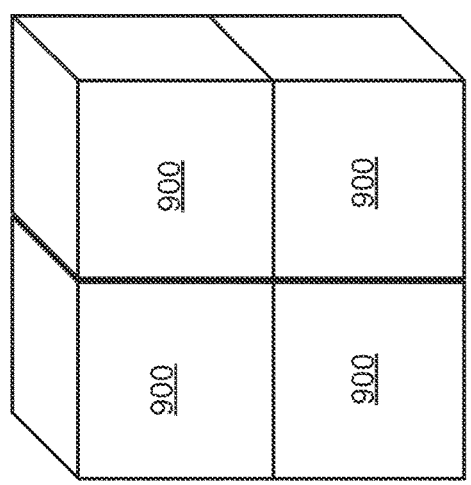
FIG. 9A is an isometric view illustrating a fuel cell system including four modular enclosures arranged in two rows and two columns.

As illustrated in FIGS. 9A-9C, a plurality of modular enclosures (i.e., fuel cell modules) may be connected to the piping manifold in the same manner in which the fuel cell stacks 410, 510 are connected in the embodiments of FIGS. 4 and 5. Fuel cell stacks are comprised of individual fuel cells with end plates compressed. Modular enclosures or fuel cell modules are complete enclosures including manifolded fuel cell stacks inside and having pipe connections extending therefrom. As seen in FIGS. 9B and 9C, the pipe connections connect each modular enclosure to the piping manifold, which may be disposed above the modular enclosures (see FIG. 9B, which is similar to FIG. 4) or horizontally aligned with the modular enclosures (see FIG. 9C, which is similar to FIG. 5). In one aspect, the modular enclosures are arranged in a single row (for example, two modular enclosures arranged in two columns and one row). In another aspect, as seen in FIG. 9A, the modular enclosures are arranged in multiple rows (for example, two modular enclosures arranged in two columns, where modular enclosures in a column are stacked vertically with respect to one another).

As seen in the example of FIG. 9A, a fuel cell system is provided where four modular enclosures 900 (each having at least one fuel cell stack therein) are placed in an arrangement where the weight of the four modular enclosures 900 against each other helps to dissipate the energy created during a deflagration event, and thus, can reduce the amount of structural steel used to make each modular enclosure 900. In FIG. 9B, the weight of a piping manifold 940 above the modular enclosures 900 is used to seal against the modular enclosures. In FIG. 9C, the piping manifold 940 is horizontally aligned with the modular enclosures 900, and the modular enclosures 900 are thrust against the piping manifold 940 to seal against the piping manifold 940.

When the piping manifold is disposed above the modular enclosures, in order to access an individual modular enclosure (and the fuel cell stacks therein), the piping manifold must first be removed.

In order to access an individual modular enclosure (and the fuel cell stacks therein), the modular enclosure would have to be disconnected from the piping manifold, for example, by unbolting or sliding the modular enclosure (e.g., to the left) and then lifting the modular enclosure out. If the modular enclosures are arranged in multiple rows (i.e., if modular enclosures are vertically stacked upon each other), to access a lower modular enclosure, the upper modular enclosure must be removed first. In other aspects, the modular enclosures may be mounted in rows of a rack that allows removal of a modular enclosure by sliding the modular enclosure out of its corresponding row, without having to remove any modular enclosures disposed above the modular enclosure to be removed. The setup could allow small clearances between the modular enclosures so that in a deflagration event, only a small deflection of the modular enclosures would occur before adjacent modular enclosures would hit each other. This would allow for less steel since the modules would support each other in the deflagration event. In other aspects, upper modular enclosure(s) may be temporarily supported by jacking that would allow for removal of a lower modular enclosure. Even when supported by jacking, the weight of the bottom modular enclosure may still be used to seal against the piping manifold.

In one aspect, any of the modular enclosures described in the embodiments above may be the modular enclosure 900 in FIGS. 9A-9C.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the concepts disclosed herein

What is claimed:

1. A fuel cell system comprising:
   at least one modular enclosure comprising a top wall, a bottom wall, and a plurality of side walls that connect the top wall and the bottom wall and close off the modular enclosure on all sides;
   at least one fuel cell stack disposed within the at least one modular enclosure;
   at least one piping manifold configured to supply at least one process gas to the at least one fuel cell stack and to receive at least one exhaust process gas from the at least one fuel cell stack; and
   at least one process gas seal configured to seal the at least one piping manifold, wherein the at least one process gas seal is effected via a static force from a weight of the at least one fuel cell stack or a weight of the at least one piping manifold;
   wherein the at least one process gas seal comprises at least one of a compressive seal, a radial seal, or a tapered seal.

2. The fuel cell system of claim 1, wherein the at least one process gas seal is effected without mechanical means for connecting the at least one fuel cell stack, the at least one process gas seal, and the at least one piping manifold.

3. The fuel cell system of claim 1, wherein:
   the at least one piping manifold is disposed within the at least one modular enclosure at a position below the at least one fuel cell stack;
   the at least one fuel cell stack is disposed on at least a portion of an upper surface of the at least one piping manifold;
   the at least one process gas seal is disposed between the at least one piping manifold and the at least one fuel cell stack; and
   the at least one process gas seal is effected via the static force from the weight of the at least one fuel cell stack against the upper surface of the at least one piping manifold.

4. The fuel cell system of claim 3, wherein the at least one piping manifold is disposed on the bottom wall of the modular enclosure.

5. The fuel cell system of claim 3, wherein:
   the upper surface of the at least one piping manifold includes at least two projections with a gap therebetween;
   the at least one fuel cell stack is disposed on the at least two projections; and
   the at least one process gas seal is disposed within the gap.

6. The fuel cell system of claim 1, wherein:
   only one fuel cell stack is disposed within the modular enclosure;
   the side walls of the modular enclosure contain manifold volumes and process gas connections, the only one fuel cell stack fluidly connected to the manifold volumes and the process gas connections;
   the at least one piping manifold is external to the modular enclosure; and
   the manifold volumes are fluidly connected to the at least one piping manifold.

7. The fuel cell system of claim 6, wherein:
   the side walls of the modular enclosure are tapered;
   the at least one process gas seal is affixed to a side of the only one fuel cell stack, the at least one process gas seal comprising a wedge-shaped seal angled at a same degree as the tapered side walls of the modular enclosure; and
   in operation, when the only one fuel cell stack is lowered into the modular enclosure, an angled surface of the wedge-shaped seal mates with the tapered side wall of the modular enclosure, and the at least one process gas seal is effected via the static force from the weight of the only one fuel cell stack against the tapered side wall.

8. The fuel cell system of claim 1, further comprising at least one closure plate, wherein:
   the top wall of the modular enclosure comprises at least one opening configured to receive the at least one closure plate; and the at least one closure plate is configured to be repeatedly and reversibly removed from the at least one opening to allow access to an interior of the modular enclosure.

9. The fuel cell system of claim 8, further comprising:
an attachment point provided at an upper surface of the at least one closure plate or an upper surface of the at least one fuel cell stack; and
a crane configured to attach to the attachment point to repeatedly and reversibly remove the at least one closure plate from the at least one opening to allow access to the interior of the modular enclosure.

10. The fuel cell system of claim 1, wherein the at least one piping manifold is disposed within the at least one modular enclosure at a position at a side of the at least one fuel cell stack.

11. The fuel cell system of claim 10, wherein:
the at least one piping manifold comprises at least partially angled side walls;
the at least one fuel cell stack comprises an angular extension configured to mate with an angled side wall of the piping manifold;
the at least one process gas seal is disposed between the angled side wall of the at least one piping manifold and the angular extension of the at least one fuel cell stack; and
the at least one process gas seal is effected via the static force from the weight of the at least one fuel cell stack.

12. The fuel cell system of claim 1, wherein at least one of the top wall, the bottom wall, or the plurality of side walls of the modular enclosure comprise insulation configured to absorb energy created during a deflagration event.

13. The fuel cell system of claim 1, wherein:
the at least one piping manifold is disposed within the at least one modular enclosure at a position above the at least one fuel cell stack;
the at least one process gas seal is provided on at least one of a lower surface of the at least one piping manifold or an upper surface of the at least one fuel cell stack; and
in operation, the at least one process gas seal is effected via the static force from the weight of the at least one piping manifold exerting a downward force on the upper surface of the at least one fuel cell stack.

14. The fuel cell system of claim 1, wherein:
the bottom wall of the modular enclosure comprises a downwardly angled surface such that a height of a plane formed by the downwardly angled surface is greater at a location distal to the piping manifold than a height of a plane at a location proximal to the piping manifold;
the at least two fuel cell stacks each comprise an angled extension that extends from a lower surface thereof, the angled extension comprising an upwardly angled surface configured to face the downwardly angled surface of the bottom wall of the modular enclosure; and
a slope of the downwardly angled surface is the same as a slope of the upwardly angled surface.

15. The fuel cell system of claim 14, further comprising at least one wheel connected to the upwardly angled surface of the angled extension, wherein:
in operation, the at least one wheel is configured to roll upon the downwardly angled surface to translate a respective fuel cell stack along the downwardly angled surface; and
the downwardly angled surface terminates against a side wall of the piping manifold.

16. The fuel cell system of claim 15, further comprising at least two process gas seals, one process gas seal corresponding to one fuel cell stack, wherein:
the at least two process gas seals each comprise a first sealing surface and a second sealing surface configured to abut with the first sealing surface;
the first sealing surface is provided on a side of a respective one of the at least two fuel cell stacks and the second sealing surface is provided on a respective side of the at least one piping manifold; and
the at least two process gas seals are effected via the static force from the weight of the at least two fuel cell stacks acting along the downwardly angled surface, which allows the at least two fuel cell stacks to apply facial pressure against the first sealing surface and the second sealing surface.

17. The fuel cell system of claim 1, wherein:
the at least one process gas seal comprises a first sealing surface and a second sealing surface configured to abut with the first sealing surface; and
the first sealing surface is provided on the at least one fuel cell stack and the second sealing surface is provided on the at least one piping manifold.

* * * * *